(12) United States Patent
Bruce et al.

(10) Patent No.: US 7,882,671 B2
(45) Date of Patent: Feb. 8, 2011

(54) MULTI-LAYER CO-EXTRUDED ROOFING MEMBRANE

(75) Inventors: Douglas Bruce, Zionsville, IN (US);
Greg Sharrun, Greenville, SC (US);
Richard Peng, Fishers, IN (US)

(73) Assignee: BFS Diversified Products, LLC

( * ) Notice: Subject to any disclaimer, the term of this patent is extended or adjusted under 35 U.S.C. 154(b) by 967 days.

(21) Appl. No.: 11/708,898

(22) Filed: Feb. 21, 2007

(65) Prior Publication Data

US 2007/0193167 A1   Aug. 23, 2007

Related U.S. Application Data

(60) Provisional application No. 60/775,128, filed on Feb. 21, 2006.

(51) Int. Cl.
*E04B 5/00* (2006.01)
*B32B 33/00* (2006.01)

(52) U.S. Cl. ............... 52/408; 264/173.11; 264/173.12; 264/173.14; 264/173.16; 264/173.19

(58) Field of Classification Search ............ 52/408; 264/173.11, 173.12, 173.14, 173.16, 173.18, 264/173.19, 175
See application file for complete search history.

(56) References Cited

U.S. PATENT DOCUMENTS

| | | | |
|---|---|---|---|
| 3,962,018 A | | 6/1976 | Costemalle et al. |
| 4,183,777 A | | 1/1980 | Summers et al. |
| 4,392,897 A | * | 7/1983 | Herrington .................. 156/66 |
| 4,808,482 A | * | 2/1989 | Benge et al. ............. 428/411.1 |
| 5,002,624 A | | 3/1991 | Howell et al. |
| 5,006,383 A | | 4/1991 | Achille et al. |
| 5,137,675 A | | 8/1992 | Rabe |
| 5,226,392 A | | 7/1993 | Breuer et al. |
| 5,473,016 A | * | 12/1995 | Fujii et al. .................. 525/74 |
| 5,486,249 A | | 1/1996 | Valaitis et al. |
| 5,494,429 A | | 2/1996 | Wilson et al. |

(Continued)

FOREIGN PATENT DOCUMENTS

EP       0458520 A2    11/1991

(Continued)

OTHER PUBLICATIONS

Wu, R.-Y, et al., "Tearing resistance of multi-layer plastic films", *International Journal of Fracture* 68: Jun. 1994, pp. 141-150, Kluwer Academic Publishers, Netherlands 1994.

(Continued)

*Primary Examiner*—Richard E Chilcot, Jr.
*Assistant Examiner*—Mark R Wendell
(74) *Attorney, Agent, or Firm*—Sarah M. Jabbari; Thomas R. Kingsbury; Faysharpe LLP (57) ABSTRACT

A multi-layer roofing membrane is provided including a top sheet including a co-extruded cap and inner layer and a bottom sheet. The use of a co-extrusion die allows for multi-layer sheets that reduce the need for expensive fillers in all but a cap layer of the membrane. A scrim reinforcement layer is optionally embedded in the membrane. When installed on a roof substrate, the membrane can be sealed by heat welding the seams of the membrane sheets or by other means.

61 Claims, 4 Drawing Sheets

U.S. PATENT DOCUMENTS

| | | | |
|---|---|---|---|
| 5,747,592 A | 5/1998 | Huff et al. | |
| 5,798,413 A * | 8/1998 | Spelthann et al. | 525/66 |
| 6,194,519 B1 | 2/2001 | Blalock et al. | |
| 6,207,754 B1 | 3/2001 | Yu | |
| 6,253,528 B1 | 7/2001 | Hubbard et al. | |
| 6,308,482 B1 | 10/2001 | Strait | |
| 6,376,039 B1 | 4/2002 | Skärin | |
| 6,394,166 B2 | 5/2002 | Hubbard et al. | |
| 6,506,842 B1 | 1/2003 | Heck et al. | |
| 6,544,909 B1 | 4/2003 | Venkataswamy et al. | |
| 6,607,793 B2 | 8/2003 | Hubbard et al. | |
| 6,645,336 B1 | 11/2003 | Albertone et al. | |
| 6,764,968 B1 | 7/2004 | Hindi et al. | |
| 6,864,194 B2 | 3/2005 | Hindi et al. | |
| 2001/0003625 A1 | 6/2001 | Apgar et al. | |
| 2002/0127933 A1 | 9/2002 | Baccus et al. | |
| 2002/0187693 A1 | 12/2002 | Cherry | |
| 2003/0198813 A1 | 10/2003 | Howell | |
| 2004/0033741 A1 * | 2/2004 | Peng | 442/38 |
| 2004/0242778 A1 | 12/2004 | Etherton | |
| 2005/0031839 A1 | 2/2005 | Mizutani et al. | |
| 2005/0032959 A1 * | 2/2005 | Cheung et al. | 524/425 |
| 2005/0053746 A1 | 3/2005 | Bartek | |
| 2005/0106965 A1 | 5/2005 | Wevers et al. | |
| 2005/0170720 A1 | 8/2005 | Christiansen et al. | |

FOREIGN PATENT DOCUMENTS

| | | |
|---|---|---|
| EP | 1063345 A2 | 12/2000 |
| JP | 2001241118 A | 9/2001 |
| WO | WO 0023509 A1 * | 4/2000 |
| WO | WO 01/23184 A1 | 4/2001 |
| WO | WO 02/075071 A1 | 9/2002 |
| WO | PCT/US2006/033522 | 8/2006 |
| WO | WO 2007/027602 A1 | 3/2007 |

OTHER PUBLICATIONS

International Search Report of the International Searching Authority, or the Declaration, Authorized Officer, Laura Fernàndez Goméz, Date of mailing, Aug. 30, 2007.

* cited by examiner

MULTI-LAYER CO-EXTRUDED ROOFING MEMBRANE

The present application claims priority to and the benefit of the filing date of U.S. Provisional Patent Application No. 60/775,128, filed Feb. 21, 2006.

BACKGROUND

The present embodiments relate to a co-extruded multi-layer structural membrane comprising at least two polymeric sheets. More particularly, the present embodiments relate to a co-extruded multilayer membrane having a cap layer adhered to a one or more support layers.

Polymeric roof sheeting is used as single ply roofing membrane for covering industrial and commercial flat roofs. Such membranes are generally applied to the roof surface in vulcanized or cured state.

Because of its outstanding weathering resistance and flexibility, cured EPDM based roof sheeting has rapidly gained acceptance. This material is often prepared by vulcanizing the composition in the presence of sulfur or sulfur containing compounds such as mercaptans or using radiation curing. Notwithstanding the usefulness of radiation curing and sulfur curing, a potential drawback of utilizing these elastomers is the lack of adhesion of EPDM, especially cured EPDM, to itself. This is a potential concern in that, in applying EPDM sheets to a roof, it is usually necessary to splice the cured EPDM sheets together along the seams. This splice or seam area is subjected to both short term and long term stresses such as those caused by roof movement, heavy winds, freeze-thaw cycling and thermal cycling. Under certain conditions, such stresses may manifest themselves in shear forces that can result in seam peel back under severe stress conditions.

In view of the foregoing, it has been necessary to use an adhesive to bond the cured EPDM sheets together. These adhesives must not only provide sufficient strength to resist the short and long term stresses described above, they must also be resistant to oxidation, hydrolysis and chemical breakdown. Adhesives that meet these requirements are difficult to produce and can be time consuming to apply to the seams of EPDM sheets, thereby increasing the overall cost of installing the waterproof membrane.

Therefore, other materials for use in roofing membrane have been investigated. Within the last decade, thermoplastic polyolefin (TPO) sheeting has come into use in the manufacture of waterproof roofing membranes. TPO membrane provides good service life, good chemical resistance and has the advantage of being recyclable. In addition, TPO membrane can be sealed along its seams without the use of an adhesive by heating the edges of the sheets to a temperature above the melt temperature of the TPO and pressing the sheets together. This technique of joining sheets of roofing membrane, known as heat welding, provides a strong seal and results in overall time and cost savings in the application of the roofing membrane.

Nevertheless, TPO roofing membrane suffers from several distinct disadvantages. First, TPO roofing generally requires scrim reinforcement embedded within the sheets to improve the flame resistance and allow manipulation of the sheets under hot air welding. Scrim is a support structure typically comprising a mesh of interwoven strands of thermoplastic. Without such scrim, the TPO often becomes too "soupy" to laminate together and may not possess sufficient mechanical properties. This scrim adds an additional cost to the TPO membrane.

Second, such membranes exhibit relatively weak bond strength with the roofing substrate. This, along with the typical ductile behavior of most TPOs prevents such membranes from supporting high wind uplift loads. In addition, present day TPO membranes are often too stiff and lacking in compliability (as indicated by the high secant modulus properties of TPO resins) due to the relatively high crystallinity of many TPOs to be easily bent to conform to the contours of a roof, and therefore are quite cumbersome to install due to this non-pliable property.

Finally, TPO layers, especially top layers, which must be loaded with various additives such as fire retardants, UV stabilizers, anti-oxidants, funcides can be expensive to produce due to the high cost of such additives.

As disclosed in published U.S. Patent Application US2001/0003625A1 to Apgar et al., it is known to produce a heat weldable roofing membrane comprised of a layer of TPE or TPO on a vulcanized EPDM sheet. Such a membrane suffers from the fact that the processing temperature of TPO and TPE and the curing temperature of EPDM are too close, thus making it difficult to seal the seam. In addition, physically bonded thermoplastic and crosslinked rubber may reject each other in the long term, resulting in delamination and compromising the effectiveness of the membrane.

Therefore, a need exists for a heat-weldable roofing membrane that retains the advantages of TPO top layers while being more pliable, easier to install and less expensive.

SUMMARY OF THE INVENTION

In a first aspect, there is provided a membrane comprising a cap layer, an upper inner layer, and at least a bottom layer, wherein the cap layer and the upper inner layer have been co-extruded through a first die. In one embodiment, the bottom layer may included a bottom inner layer and a core layer which have been co-extruded through a second die.

In a second aspect, there is provided a membrane comprising a top sheet and a bottom sheet and a scrim positioned therebetween, wherein said top sheet comprises a cap layer, and an upper inner layer, wherein said bottom sheet comprises a lower inner layer and a core layer, wherein said cap layer and said upper inner layer have been co-extruded through a first die, and wherein said lower inner layer and said core layer have been co-extruded through a second die.

In a third aspect, there is provided a structural membrane comprising a cap layer, an inner layer, a scrim, and a core layer, wherein at least one of said layers comprises a TPO.

In a fourth aspect, there is provided a roof deck having a roofing membrane adhered thereto, said roofing membrane comprising at least a top and bottom sheet bonded together, said top sheet comprising a co-extruded cap layer and upper inner layer.

DETAILED DESCRIPTION

As used herein, the term co-extrusion refers to a manufacturing process in which two or more polymeric compounds are fed into a common extrusion die having a single discharge orifice and form distinct yet intimately bonded layers in a finished extruded sheet. This may be accomplished through a combination of control of viscosity and flow rates of the different compounds as well as the die geometry, which together maintain separate and generally uniform layers in the extruded piece.

In the present embodiments, co-extrusion is used to both reduce material costs as well as add unique properties to extruded roofing membranes. Costs can be reduced by co-extruding lower cost inner layer(s) and/or a bottom layer of material with a higher cost top layer in lieu of a single extrusion of higher cost material. Special properties such as color, fire retardancy, oil resistance, and/or enhanced strength can be achieved by co-extruding a thin layer of material with special properties on top of a layer of standard base material.

The present embodiments find particular application with respect to structural membranes for use in housing, construction, aquatic applications, etc. The discussion and figures presented herein relate particularly to roofing membranes useful on various types of roofs, including flat or low-sloped roofs. However, other structural membranes are contemplated and are intended to be encompassed by the present claims and discussion. Particularly, geo membranes such as pond liners, aquatic farm liners, etc. are specifically covered. In addition, the present embodiments relate to other membranes such as scaffold sheeting, tarpaulins, shelters, and other damp proof or waterproof membranes.

Figure 1:
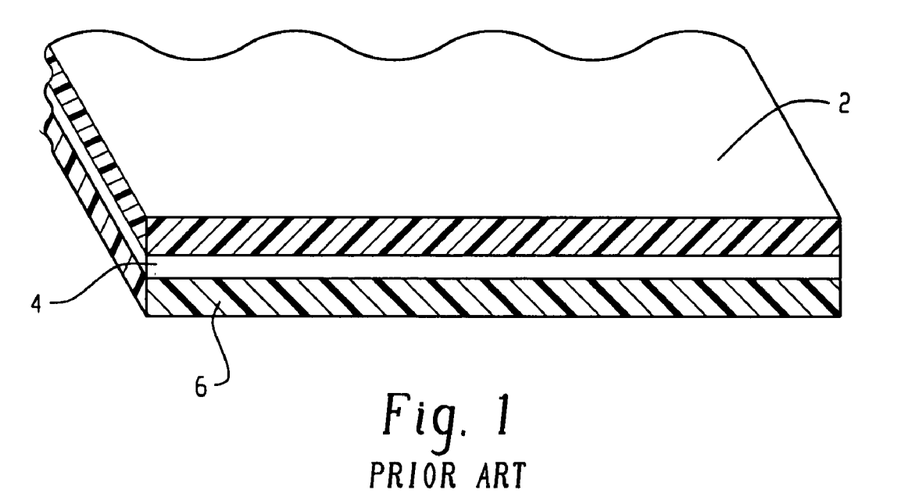
FIG. 1 is a cross-section of a prior art roofing membrane.

With reference to FIG. 1, prior art TPO roofing membranes have generally included an extruded top layer 2, an intermediate scrim layer 4, and an extruded bottom layer 6. The top layer, which is exposed to the elements, contains significant amounts of additives such as fire retardants, antioxidants, and UV blockers in order to assure satisfactory service life as well as meet industry standards. Because the bottom layer is not exposed in normal applications, the material for this layer requires fewer expensive additives. In addition, the bottom layer can typically also contain lower grades of polymer as well as re-processed material to further reduce cost.

The present embodiments make use of the process of co-extrusion to produce a three or more polymeric layer laminate. A scrim layer, if present in the finished membrane, is not considered a "layer" for purposes of the present discussion. That is, "layers" refer only to the polymeric extruded material layers. Thus, with reference to FIG. 2, a three layer laminate roofing membrane 10 is shown in accordance with one embodiment of the present invention. The roofing membrane 10 includes a cap layer 12, an upper inner layer 14 and a core (or bottom) layer 18. The cap layer refers to the layer of the membrane that will be laying face up when the membrane is installed on a roof while the core layer is the layer that will be facing the roof deck. All three layers may be made from the same polymeric material, such as thermoplastic polyolefin (TPO) or TPO blends, although this is not necessary. Specifically, the upper inner layer 14 and core layer 18 may be made from a lower cost polymeric material, such as linear low density polyethylene (LLDPE) or other lower cost polymer material.

Figure 2:
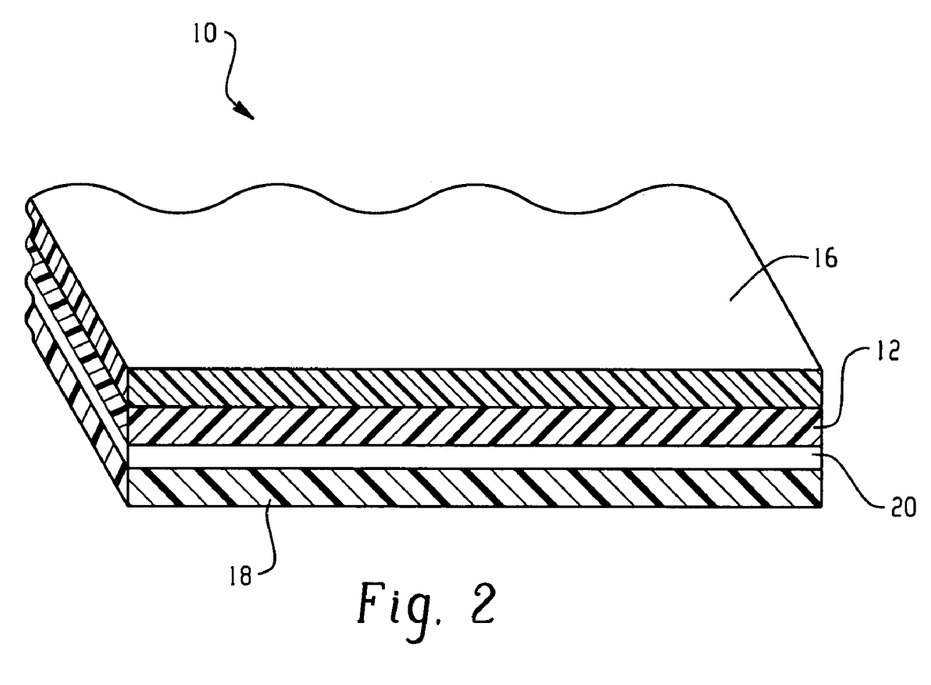
FIG. 2 is a cross-section of a 3-layer roofing membrane made in accordance with the present embodiments.

The cap layer 12 and upper inner layer 14 are co-extruded through a common extrusion die to form an intimately bonded bi-layer sheet. This sheet may be subsequently bonded together with a core layer 18 and, optionally, an intermediate scrim 20 via known means such as calendering rolls or lamination wheels to form the final membrane 10.

As detailed above, the cap layer may comprise the same or different base polymeric material as the upper inner layer and/or the core layer. However, since the cap layer will be facing up and exposed to the elements, it typically will contain a number of additives in order for the membrane to meet various building codes and roofing membrane standards.

That is, when made from the same base polymeric material, the primary difference between the layers is the inclusion of different additives to each layer. By using a co-extrusion process, specialty additives necessary for the membrane to meet such codes and standards (e.g. fire retardants, anti-oxidants, UV stabilizers, weatherability and chemical resistance enhancers, etc.) can be confined to the relatively thin cap layer, reducing the amount of such fillers needed and the resulting cost. In addition, other fillers that improve the physical properties of the membrane can be added to the inner and core layers.

Thus, the resulting membrane can be made more cheaply by restricting expensive fillers to the cap layer only, while also improving the physical properties of the membrane as a whole by limiting the amount of such specialty fillers (which often tend to negatively impact the mechanical properties of a material) as well as allowing for the possibility of incorporating other, mechanically favorable fillers in the other layers.

In another embodiment, a four layer laminate is produced having co-extruded bi-layer top and bottom sheets. Again, an intermediate scrim layer may be included between the co-extruded sheets.

Figure 3:
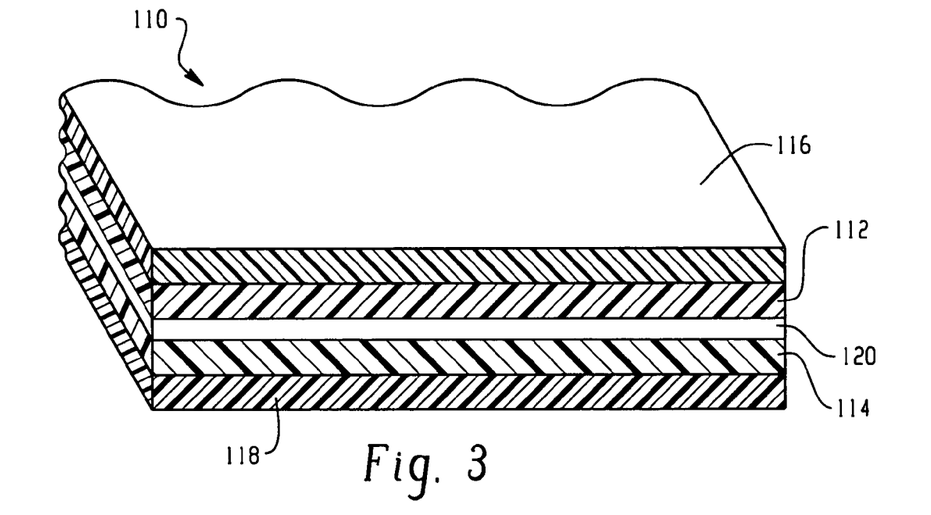
FIG. 3 is a cross-section of a 4-layer roofing membrane made in accordance with the present embodiments.

Thus, with reference to FIG. 3, a four layer laminate roofing membrane 110 is shown in accordance with one embodiment of the present invention. The roofing membrane 110 includes upper and lower inner plies or layers 112, 114 a cap layer 116, and a core layer 118. Again, all four layers may be made from thermoplastic polyolefin (TPO) or TPO blends or other polymeric materials. Specifically, the two inner plies 112, 114 may be made from linear low density polyethylene (LLDPE) or other lower cost polymer material.

A scrim reinforcement layer 120 may be provided between the two inner layers for added support.

As indicated above, the layers of the membrane may independently be formed from TPO or other polymeric material. Preferably, at least the cap layer contains a TPO component. The TPO layer used in the various embodiments of the present invention may be any commercialized TPO conventionally used in roofing membrane applications. TPOs are a class of uncrosslinked thermoplastic elastomers (TPEs) based predominantly or wholly on olefin polymers.

Thermoplastic elastomers (TPEs) are an important class of polymeric compositions that are particularly useful in producing durable components through conventional extrusion, calendaring or injection molding processes. Typically a TPE is a blend of thermoplastic polymer and an elastomer rubber. TPEs possess properties similar to a cured elastomer but TPEs have the advantage, compared to a rubber, that they undergo plastic flow above the melting point of the thermoplastic polymer component of the blend. This permits TPEs to be used in component fabrication through common polymer processing techniques, such as injection molding techniques to produce finished articles having resilient rubber-like properties without the need for a vulcanizing cure of the finished article. This provides TPEs with an advantage compared to conventional curable elastomers because conventional curable elastomers are tacky, do not undergo plastic flow at elevated temperatures and therefore cannot be fabricated into finished article forms by an extrusion or injection molding technique.

A typical TPO is a melt blend or reactor blend of a polyolefin plastic, typically a propylene polymer, with a non-crosslinked olefin copolymer elastomer (OCE), typically an ethylene-propylene rubber (EPM) or an ethylene-propylene-diene rubber (EPDM). In those TPOs made from EPDM, the diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. Conventional EPDM's utilized in TPOs for roofing membranes include various grades of VISTALON, available from the Exxon Chemical Co., and ROYALENE, available from Uniroyal Chemical Co.

The polyolefin plastic imparts to the TPO the temperature resistance and rigidity typical of that thermoplastic resin while the olefin copolymer elastomer imparts flexibility, resilience and toughness to the TPO. As stated, any conventional TPO used in the roofing membrane industry is suitable for use in the present invention. Preferred TPOs are those made by blending ethylene-propylene elastomers with polypropylene.

The ethylene-propylene elastomers may be blended with the polypropylene by conventional mixing techniques. An example of a suitable group of TPOs for use in the present invention are medium flow TPOs manufactured under the trade name ADFLEX, available from Basell. TPO blends are also useful in the present embodiments.

In another embodiment, at least one of the layers in the laminate comprises a blend of a plastomer, a low density polyethylene, and a propylene-based polymer, as described in commonly owned co-pending PCT application no. Pct/US2006/033522, filed on Aug. 29, 2006, the disclosure of which is incorporated herein by reference in its entirety.

More specifically, in one or more of these embodiments utilizing such a blend, the plastomer may include an ethylene-α-olefin copolymer. The plastomer employed in one or more embodiments of this invention may include those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The a-olefin employed in preparing the plastomer of one or more embodiments of this invention may include butene-1, pentene-1, hexene-1, octene-1, or 4-methyl-pentene-1.

The plastomer of one or more embodiments of this invention can be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7 \times 10^4$ to $13 \times 10^4$ g/mole, in other embodiments from about $8 \times 10^4$ to about $12 \times 10^4$ g/mole, and in other embodiments from about $9 \times 10^4$ to about $11 \times 10^4$ g/mole as measured by using GPC with polystyrene standards. In these or other embodiments, the plastomer may be characterized by a weight average molecular weight in excess of $5 \times 10^4$ g/mole, in other embodiments in excess of $6 \times 10^4$ g/mole, in other embodiments in excess of $7 \times 10^4$ g/mole, and in other embodiments in excess of $9 \times 10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The plastomer of one or more embodiments of this invention may be prepared by using a single-site coordination catalyst including metallocene catalyst, which are conventionally known in the art. Useful plastomers include those that are commercially available. For example, plastomer can be obtained under the tradename EXXACT™ 8201 (ExxonMobil); or under the tradename ENGAGE™ 8180 (Dow DuPont).

Similarly, in one or more these embodiments, the low density polyethylene may include an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system. Useful linear low density polyethylene includes those that are commercially available. For example, linear low density polyethylene can be obtained under the tradename Dowlex™ 2267G (Dow); or under the tradename DFDA-1010 NT7 (Dow).

In one or more embodiments, the propylene-based polymer of the blend may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The a-olefins may include butene-1, pentene-1, hexene-1, oxtene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of these embodiments may be characterized by a melt flow rate of from about 0.5 to about 15 dg/min, in other embodiments from about 0.7 to about 12 dg/min, in 10 other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1\times10^5$ to about $5\times10^5$ g/mole, in other embodiments from about $2\times10^5$ to about $4\times10^5$ g/mole, and in other embodiments from about $3\times10^5$ to about $4\times10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

In addition to the polymeric component, various fillers and processing materials as well as other components may be added to one or more of the layers in the membrane of the present embodiments. Suitable fillers may include reinforcing and non-reinforcing materials such as those customarily added to roofing membranes. Non-limiting examples of such fillers include carbon black, calcium carbonate, clay, silica, and the like. With respect to processing materials, various processing oils, waxes and the like intended to improve the processing of the material may be included in any concentration that does not significantly detract from the properties of the membrane.

The polymer may also be formulated with stabilizers, pigments and antioxidants to obtain the appropriate weathering properties. In addition, flame retardant fillers such as alumina trihydrate (ATH), magnesium trioxide, calcium carbonate, mica, talc, or glass may be added. Adding ATH to the inner layer(s) and/or core layer has great advantage since LLDPE can be processed below the decomposition temperature of ATH. Filler levels can range from 0 to about 80% by weight.

In this respect, flame retardants may include any compound that will increase the burn resistivity of the membranes of the present invention or at least one layer thereof. In one or more embodiments, the flame retardant may include halogenated flame retardants, non-halogenated flame retardants, or mixtures thereof. Examples of halogenated flame retardants may include halogenated organic species or hydrocarbons such as hexabromocyclododecane or N,N'-ethylene-bis(tetrabromophthalimide). Exemplary non-halogenated flame retardants include magnesium hydroxide, alumina trihydrate, zinc borate, ammonium polyphosphate, melamine polyphosphate, and antimony oxide.

Magnesium hydroxide ($Mg(OH)_2$) is commercially available under the tradename Vertex™, ammonium polyphosphate is commercially available under the tradename Exolite™ (Clarian), which is sold together as a polyol masterbatch, melamine polyphosphate is available under the tradename Budit™ 3141 (Budenheim), and antimony oxide ($Sb_2CO_3$) is commercially available under the tradename Fireshield™.

In one or more embodiments, treated or functionalized magnesium hydroxide may be employed. For example, magnesium oxide treated with or reacted with a carboxylic acid may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. Treated magnesium hydroxide is commercially available.

Other additives can include additional various stabilizers. Stabilizers may include one or more of a UV stabilizer, an antioxidant, and an antiozonant. UV stabilizers may include Tinuvin™ 622. Antioxidants can include Irganox™ 1010.

Other materials that could be used in forming the layers include various thermoplastics such as nylon as well as thermoplastic vulcanizates (TPV's). TPV's are polyolefinic matrices, preferably crystalline, through which thermoset elastomers are generally uniformly distributed. Examples of thermoplastic vulcanizates include EPM and EPDM thermoset materials distributed in a crystalline polypropylene matrix. One example of a commercial TPV is SANTOPRENE thermoplastic rubber, which is manufactured by Advanced Elastomer Systems and is a mixture of crosslinked EPDM particles in a crystalline polypropylene matrix. These materials have found utility in many applications which previously used vulcanized rubber, e.g. hose, gaskets, and the like. TPV's are noted for their processability as thermoplastics while retaining the excellent resilience and compression set properties of vulcanized rubbers.

Commercial TPV's are typically based on vulcanized rubbers in which a phenolic resin, sulfur or peroxide cure system is used to vulcanize, that is crosslink, a diene (or more generally, a polyene) copolymer rubber by way of dynamic vulcanization, which is a process in which the rubber is crosslinked while mixing (typically vigorously), in a thermoplastic matrix. Sulfur or a phenolic resin is typically preferred over peroxide free radical cure systems because peroxide may degrade and/or crosslink the polypropylene or polyethylene thermoplastic as well as the rubber and this is in turn limits the extent of rubber crosslinking that can occur before the entire mixture degrades or crosslinks and is no longer thermoplastic.

A preferred method of preparing a thermoplastic vulcanizate known by those skilled in the art is to form an admixture of non-crosslinked elastomeric polymer and polyolefin resin and curing agent. The admixture is then masticated at a vulcanization temperature. Preferably the non-crosslinked polymer and polyolefin are intimately mixed before a curing agent is added. When prepared in a conventional mixing apparatus such as a multiple-roll mill, Banbury or Brabender mixer or mixing extruder, this is known as a "two-pass" cycle. Additional additives may added, including, but not limited to those fillers, fire retardants, stabilizers, pigments and antioxidants described above with respect to the TPO layer.

Any conventional TPV having the desired weatherability, flexibility and strength may be used in the present embodiments. An exemplary TPV includes a copolymer of ethylene and a carbonyl containing monomer such as vinyl acetate, acrylic acid, (alk)acrylic acid, methacrylate and unsaturated polycarboxylic acid. A particular TPV is a dynamically cured blend of metallocene polyethylene (m-PE), ethylene/vinyl acetate or ethylene/methacrylate copolymer, and optionally, a polypropylene polymer. As used herein, polypropylene polymer is meant to include both homopolymers as well as copolymers of polypropylene and another olefinic polymer. A suitable propylene polymer is ethylene-propylene random copolymer. A peroxide may be used as the curing agent. The metallocene polyethylene may be a homopolymer or a copolymer of ethylene and a small amount of olefinic monomer. A suitable ethylene copolymer is an ethylene/vinyl acetate copolymer marketed under the name EVANTANE, available from AtoFina. The various ingredients may be mixed and dynamically cured using standard techniques known in the industry. For example, the compounding ingredients can be admixed, utilizing an internal mixer (such as a Banbury or Brabender mixer or other mixers suitable for forming a viscous relatively uniform admixture.

As noted, a scrim reinforcement layer 120 may be used in any of the embodiments. A suitable scrim reinforcement layer may comprise a mesh of interwoven strands of thermoplastic or metal having a tensile strength sufficient to resist tearing when exposed to typical tensile loads experienced by roofing membranes from various directions. A preferred scrim reinforcement layer is one comprised of polypropylene or polyethylene terephthalate (PET), although of course other materials may be used.

The membrane of the present invention may be formed by co-extruding the cap and upper inner layer 16, 12 through a single extrusion die to form a single sheet of material in which the two materials are intimately bonded, but nevertheless retain a relatively distinct dividing line between the two. This is accomplished through a combination of control of viscosity and flow rates of the different compounds as well as the die geometry, which together maintain separate and uniform layers in the extruded piece. The relative thicknesses of each of the layers may be varied, but for cost saving purposes, the thickness of the top layer 16 is preferably as thin as possible without degrading the properties of the resultant membrane.

When the bottom sheet comprises only a single bottom core layer, for example as in the embodiment of FIG. 2, the core layer may be provided through conventional means, such as by extrusion through a conventional extrusion die. The two sheets may then be run through a lamination wheel with an intermediate scrim layer (when present) to form the final membrane.

When the bottom sheet comprises two or more layers, such as shown in the embodiment of FIG. 3, these two or more layers can likewise be extruded through a single extrusion die to form a co-extruded sheet in which the two materials are intimately bonded, but nevertheless retain a relatively distinct dividing line between the two. The two sheets may then be run through a lamination wheel with an intermediate scrim layer to form the final membrane.

Figure 4A:
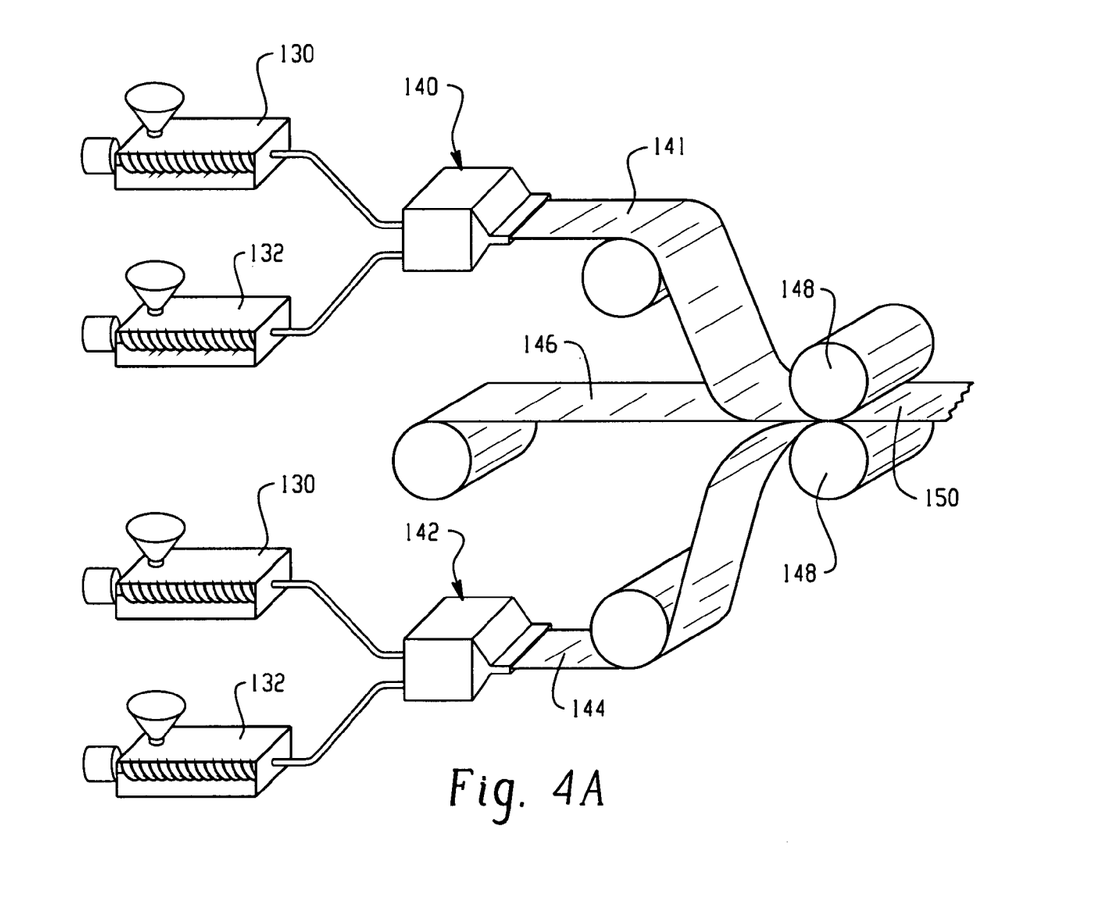
FIG. 4A is a schematic diagram showing the set-up for co-extruding a roofing membrane according to a present embodiment.

With more detail and with reference to FIG. 4A, an exemplary process for forming a four layer membrane is shown. Twin screw extruders may be set up for each individual layer material. Thus, for a four ply membrane as discussed above, four extruders 130 and 132 are set up in parallel arrangement. The extruders may process pre-compounded material in pellet form, for example, or the material for the individual layers may be compounded in the extruders themselves. The cap layer 116 and upper inner layer 112 are then extruded through a multi-manifold die 140 or a single manifold die with a multi-component capable feedblock to form an upper co-extruded top sheet 141. Likewise the bottom inner layer 114 and core layer 118 are extruded through a similar die 142 to form a lower co-extruded sheet 144. Such dies and feedblocks are available commercially from various manufacturers, such as Extrusion Dies Industries, LLC (Chippewa Falls, Wis.). Suitable dies include those described in U.S. Pat. No. 5,494, 429, the disclosure of which is incorporated herein by reference. The upper and lower sheets are bonded together with an intermediate scrim 146 via known means such as a pair of calendering rolls 148 or lamination wheels to form the final membrane 150.

Figure 4B:
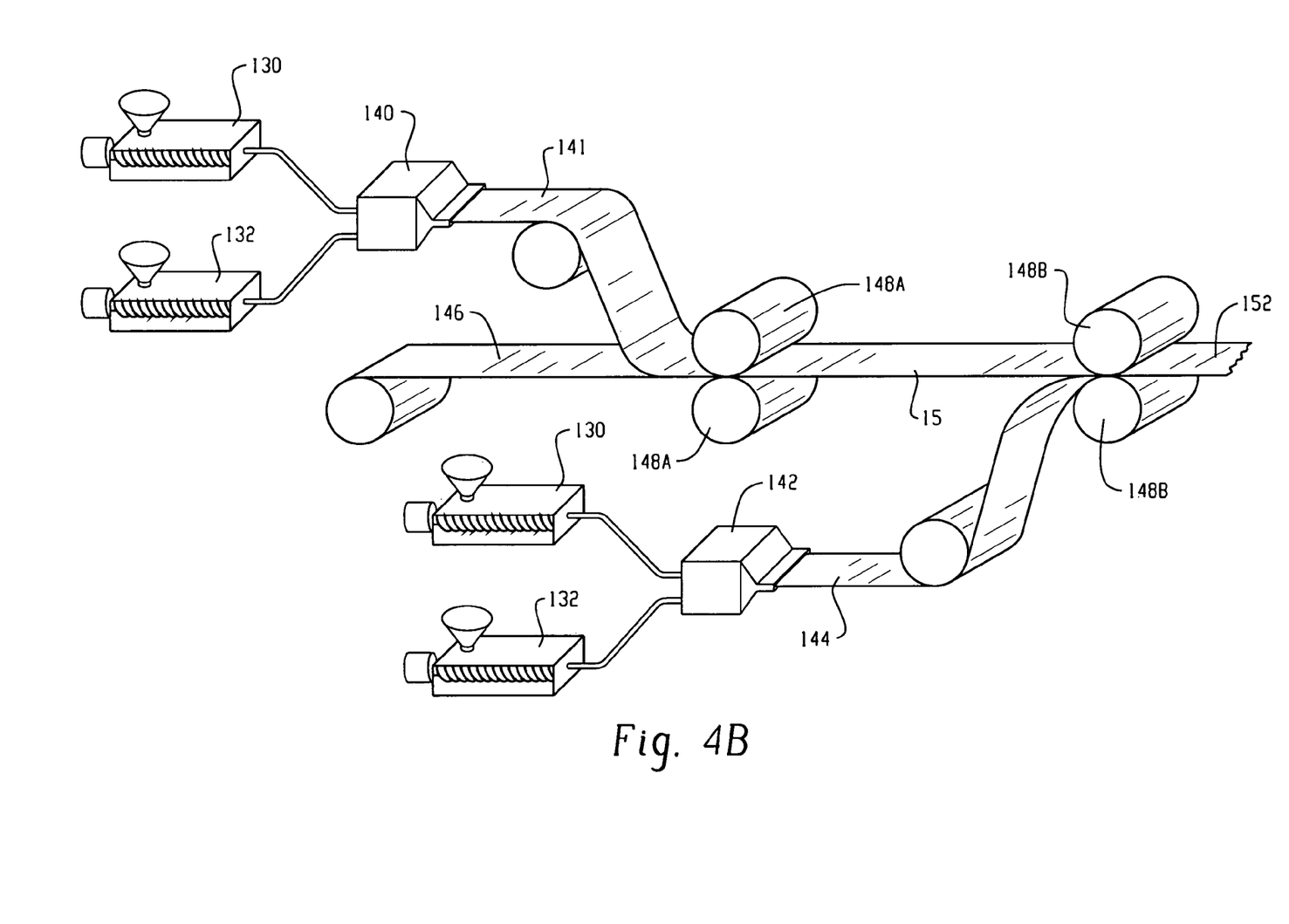
FIG. 4B is a schematic diagram showing an alternate set-up for co-extruding a roofing membrane according to a present embodiment.

Alternately, and with respect to FIG. 4B, two pairs of calendering rolls or lamination wheels, 148A and 148B, can be used to sequentially bond the upper sheet 141 to a scrim layer 146 and then subsequently bonding the lower sheet 144 to the upper sheet/scrim laminate 151 to form the final membrane 152. Although such a process requires the use of additional calendering rolls or lamination wheels, it allows one to more easily and independently control the thicknesses of both the upper and lower sheets by controlling the gap distance between the rolls or wheels. This allows one to optimize the thickness of the relatively more expensive cap layer in relation to the other layers in the final membrane.

As detailed above, the co-extrusion process can be performed using a dual or multi-cavity die or a single cavity die with a multi-component or "splitting" feedblock. With regard to a single manifold die with a multi-component capable feedblock, precise control of the layer sequence arrangements can be preset upstream of the combining point in the feedblock by installing a customized selector spool, without the need to remove the feedblock from the line. Layers pass through the sculptured manifolds that are housed in split-body combining spools. Fine adjusters allow these combining spools to be rotated to vary both the height and width of the tapered exit geometry for each layer, providing on-line control of layer uniformity in the final product. Such single cavity dies with multi-component feedblocks are commercially available and potentially work best when the two or more polymeric materials introduced into the die for forming distinct layers of the sheet have similar viscosities.

Dual or multi-cavity dies on the other hand have distinct flowpaths for the polymeric materials in each cavity. Depending on the exact design of the die, these flowpaths meet at some point within the die prior to exiting the output orifice of the die. While more expensive that single cavity dies, dual or multi-cavity dies are more flexible and allow for more control over co-extrusion of a wider range of materials having different viscosities and other properties. The line speed can be any conventional rate typically used for roofing membranes. Roofing membranes are typically sheeted in 10 foot (3.05 m) widths.

Figure 5A:
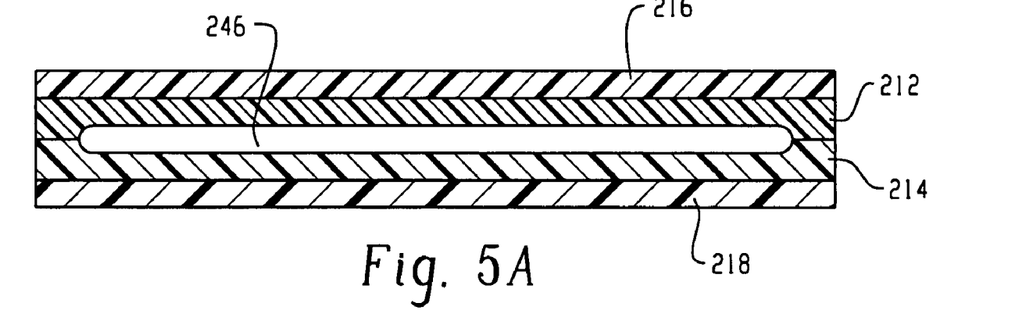
FIGS. 5A, 5B, and 5C show a cross-sections of an edge of a roofing membrane according to various present embodiments where the scrim is encapsulated by one or more of the polymeric layers of the membrane.
Figure 5B:
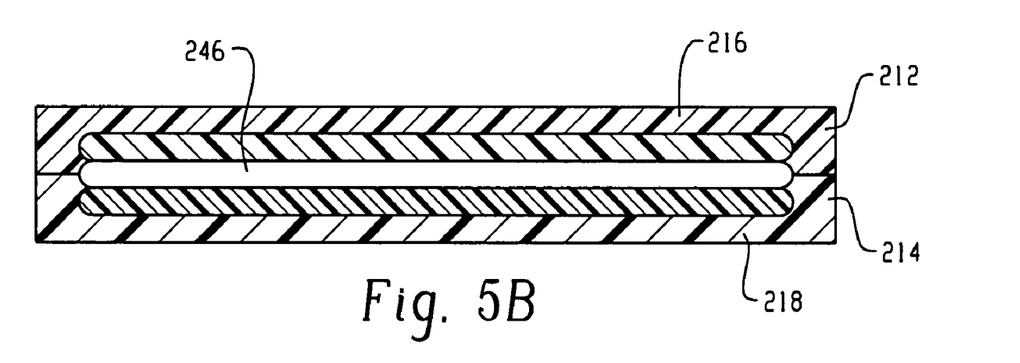
Figure 5C:
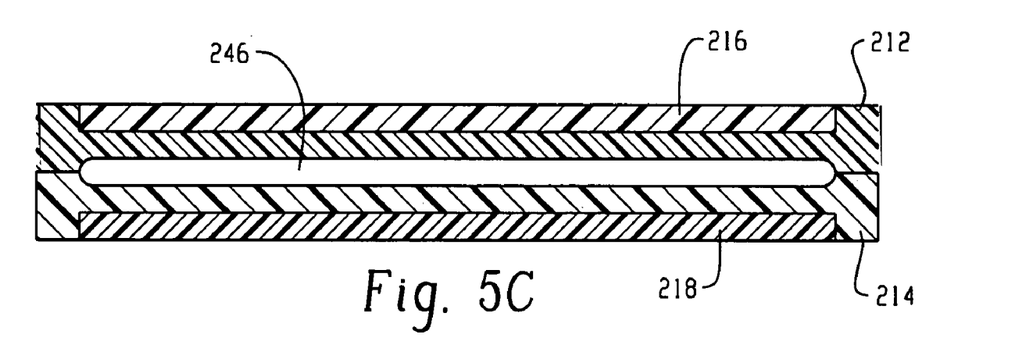

As shown in FIGS. 5A, 5B and 5C, in one embodiment, the individual layers 212, 214, 216, 218 of the membrane may overcoat the sides of the scrim 246 such that the scrim is completely surrounded by the layers on the sides of the membrane, producing what is known as a "gum edge". That is, the scrim does not extend to the edge of two or more of the membrane layers, but instead at least one of the cap layer 216 and upper inner layer 212 and at least one of the bottom inner layer 214 and core layer 218 are bonded to each other at the edges to encapsulate the scrim. FIG. 5A shows an embodiment wherein all four layers encapsulate the scrim. FIG. 5B shows an alternate embodiment wherein only the cap and core layers encapsulate the scrim. FIG. 5C shows still another alternate embodiment wherein only the upper and lower inner layers encapsulate the scrim. Similar arrangements are possible with membranes having a different number of layers.

The use of co-extrusion allows for the use of less expensive materials in all but the top layer and a reduction in the amount of fillers normally needed for a roofing membrane while still allowing the membrane to meet industry standards. Co-extrusion shows better results than a comparable membrane that might be produced using multiple single material extruders because the bond between the layers is more intimate and secure and reduces the chances of de-lamination. In addition, it reduces the need for additional lamination wheels or other bonding mechanisms.

The above embodiment describes three and four ply membranes with an intermediate scrim. Of course, additional layer membrane can also be produced by extruding additional materials through the dies to form additional layers. Thus, a six layer membrane could be produced by co-extruding three layers through both first and second dies, or a 4-layer membrane with three layers co-extruded through a first die and a single layer extruded through a second die. Other arrangements are likewise contemplated and can be produced by simply adding additional extruders to feed each of the dies. In this way, customized membranes with any properties can be produced.

Generally, the thickness of each of the plies may preferably range between from about 2-25 mils (0.051-0.64 mm), in one embodiment between 5 and 23 mils (0.13-0.58 mm), and in another embodiment between 6 and 21 mils (0.15-0.53 mm), although greater or less thicknesses may be employed and thus, are not precluded. The total thickness of the membrane is typically from about 30 to about 100 mils (0.76-2.54 mm), in one embodiment from 35 to 65 mils (0.89-1.65 mm) preferably at least 39 mils (1.0 mm), or the minimum thickness specified in standards set by the Roofing Council of the Rubber Manufacturers Association for non-reinforced rubber sheets for use in roofing applications.

The multi-layer co-extruded sheets may be adhered to each other along with an intermediate scrim. This can be accomplished using conventional techniques known in the industry. For example, the co-extruded sheets may be melt-bonded to each other under elevated temperature and pressure or laminated using a lamination roll.

The above described membranes can be installed on a roof deck. During installation on a roof deck, sheets of the roofing membrane of the present invention may be bonded to each other without the use of adhesives using heat welding. Such techniques are well-known in the industry. Generally, sheets of the roofing membrane are laid on the roof such that each sheet overlaps an adjacent sheet. Next, heat and pressure are applied to the overlapping edges of the two roofing membrane sheets to form a seam. The amount of overlap and the corresponding width of the seam can vary depending on the requirements of the application. At the location of the seam, heat is applied to the membrane to raise its temperature above the melt temperature of the TPO layer(s). The TPO layer(s) will flow along the seam, forming a weatherproof seal. Alternately, adhesives may be used to adhere the sheets to each other and/or the roof deck. Such adhesives may include solvent based adhesives or hot melt adhesives applied either at the factory or on the job site.

In this respect, the above described co-extrusion process can be modified such that an extruded adhesive or other polymeric material can be co-extruded on only the edges of one or more of the membrane layers during the process. This can be accomplished by the use of internal baffles and/or modified feedblocks to ensure that the adhesive or polymeric material is confined to only the edges of the membrane. The polymeric material may comprise a different polymer having higher strength than other parts of the membrane to improve hold down strength of the membrane on the roof deck.

As described above, one embodiment of a roofing membrane as described herein comprises top and bottom TPO layers, each co-extruded with a separate TPO layer. While the top and bottom TPO layers are loaded with anti-oxidants, pigments and flame retardants, the inner layers may be loaded with a reinforcing filler such as wollastonite (calcium silicate) or glass fiber filler to increase the crystallinity, which decreases the strain (creep) relaxation of the membrane. Thus, the membrane provides the advantages of heat weldability, strong mechanical performance and excellent chemical resistance, while still allowing the membrane to be pliable, allowing for easier handling and installation of the membrane.

Although not intended to be limiting, a roofing membrane according to the present embodiments may have a flexural modulus, which may also be referred to as a 1% secant modulus of from 10,000 to 30,000 psi (69-207 MPa), as measured according to ASTM D-790, in one embodiment from 12,000 to 25,000 (83-172 MPa).

Likewise, the roofing membrane preferably meets or exceeds all standards for TPO roofing membrane as outlined in ASTM D6878 (the current active standard is D6878-06a). Thus, the membrane preferably meets or exceeds the standards in table 1 below, as well as other standards outlined in ASTM D6878, such as weather resistance, properties after heat aging, etc.

TABLE 1

| | |
|---|---|
| Thickness | 1.0 mm |
| Breaking strength | 976 N |
| Tearing strength | 245 N |
| Brittleness point (max) | −40° C. |

As detailed above, depending on the application and the desired properties of the final membrane, no reinforcing scrim may be necessary. The bottom layer of the membrane typically contributes to producing a secure seam during the heat welding of the membrane. The roofing membranes produced according to the present embodiments advantageously cost less to produce than a pure TPV membrane and are 100% recyclable.

EXAMPLE

A sample 4-layer membrane made in accordance with the teachings of the present embodiments comprising ADFLEX TPO laminated onto a scrim reinforcement in accordance with the formulation set out in Table 2 was produced. The numbers are the weight percent of each component in the layers. The mechanical properties of this membrane were better than a conventional 2-ply TPO membrane known by those skilled in the art having the same grade of ADFLEX on both sides of a standard polypropylene scrim.

TABLE 2

| Component | Cap Layer | Upper Inner Layer | Bottom Inner Layer | Core Layer |
|---|---|---|---|---|
| TPO Resin | 51.50 | 85.00 | 85.00 | 85.50 |
| Phenolic Antioxidant | 0.15 | | | 0.10 |
| Phosphate Antioxidant | 0.40 | | | 0.30 |
| HALS 1 | 0.15 | | | |
| HALS 2 | 0.15 | | | |
| Struktol TR-016 | 0.15 | | | 0.20 |
| Vertex HST | 38.50 | | | 12.50 |
| Kronos 2160 | 5.00 | | | 1.00 |
| Firebrake ZB | 4.00 | | | |
| Wollastonite | | 15.00 | 15.00 | |
| Carbon Black | | | | 0.40 |
| TOTAL: | 100.00% | 100.00% | 100.00% | 100.00% |

HALS 1(hindered amine short term UV light stabilizer): Tinuvin 770 from Ciba Specialty Chem.
HALS 2 (long term UV stabilizer): Tinuvin 622 from Ciba Specialty Chem.
TR-016 (calcium based fatty acid metal soap lubricant): from Struktol Co. External Lubricant
Vertex HST: magnesium hydroxide (flame retardant) treated with stearic acid from JM Huber
Kronos 2160: titanium oxide white pigment from Kronos
Firebrake ZB: Zinc borate flame retardant from Borax
Wollastonite: Nyglos 8 (a white reinforcing filler) from Nycon Minerals Co.

The scrim used was a 9×9 weft insertion, 1000 denier polyester. The thickness of the layers in the membrane was: cap layer (21 mil-0.53 mm), upper inner layer (6 mil-0.15 mm), lower inner layer (6 mil-0.15 mm), and core layer (21 mil-0.53 mm) for a total membrane thickness of 60 mils (1.52 mm). This membrane passed Class A UL burn on 4" ISO95+ GL. The membrane was tested on a FSBP wind simulator and had a rating of 120 lbs/sf (5.75 kPa). It was found that the tongue tear, puncture resistance and bond strength (regardless of substrate) are superior for the present 4-ply membrane compared to conventionally extruded 2-ply TPO membranes, thus giving overall improved membrane performance.

It is also possible that, in certain applications, just the co-extruded top-sheet may be used as a roofing membrane, without a scrim layer, or core layer.

Specific design features for the membranes can be controlled by varying the composition of one or more the membrane layers, including both identity of the base polymeric material as well as the identity and amount of additives to each layer. Although not limiting, examples of various desired membrane characteristics and potential strategies to improves such characteristics include:

(A) for better oil/gasoline resistance—use a thin cap layer comprising high crystalline HDPE or Fluoro-polymer.

(B) for steep slope flame resistance—incorporate a thin surface layer of liquid crystalline polymers (LCP) or fluoropolymers or nano-mineral oxide/hydroxide as flame retardant.

(C) for improved mechanical properties—use LLDPE based PE/PP blend as the inner plies to enhance the puncture resistance.

(D) for better UV, thermal stability and long term reflectivity—use nano-mineral (zinc, copper, tin, magnesium) oxide or hydroxide, some of which can also can function also as a fire retardant.

(E) for desired colors—add pigment concentrate to the cap layer compound, the color of the inner ply also can be adjusted to enhance the color on the surface.

(F) for cost reduction—load all the functional additives in the cap layer only. All the inner plies are made of cheaper polymers with only high puncture resistance/mechanical strength required.

The invention has been described with reference to the preferred embodiments. Obviously, modifications and alterations will occur to others upon a reading and understanding of this specification. The invention is intended to include all such modifications and alterations in so far as they come within the scope of the appended claims and the equivalents thereof.

What is claimed is:

1. A structural membrane comprising a polymeric top sheet and bottom sheet, wherein said top sheet comprises a co-extruded cap layer, and an upper inner layer oriented between said cap layer and said bottom sheet, said cap layer and said upper inner layer being co-extruded through a common die creating an intimately bonded bi-layer, said cap layer further comprising a thermoplastic olefin, and wherein said bottom sheet comprises a co-extruded lower inner layer and a core layer, said lower inner layer and said core layer being co-extruded through a second die to create an intimately bonded bi-layer.

2. The membrane of claim 1, further comprising an intermediate scrim layer positioned between said top and bottom sheets.

3. The membrane of claim 1, wherein said core layer comprises a thermoplastic olefin.

4. The membrane of claim 1, wherein said cap layer comprises fire retardant additives and said other layers are at least substantially free of such additives.

5. The membrane of claim 1, wherein said die is a dual cavity die.

6. The membrane of claim 1, wherein said cap layer comprises a fire retardant, and a UV stabilizer.

7. The membrane of claim 1, wherein at least one of said layers except said cap layer comprises a reinforcing filler that functions to improve the mechanical properties of said membrane.

8. The membrane of claim 7, where said reinforcing tiller comprises wollastonite.

9. The membrane of claim 1, wherein said membrane comprises a nano-mineral or nano-clay.

10. The membrane of claim 1, wherein said upper inner layer comprises linear low density polyethylene (LLDPE).

11. The membrane of claim 10, wherein said inner layer comprises a LLDPE/PP blend.

12. The membrane of claim 1, wherein said cap layer comprises a pigment and wherein said other layers are substantially free of pigment.

13. The membrane of claim 1, wherein said membrane comprises an extruded adhesive on the edges of said membrane.

14. The membrane of claim 1, wherein said cap layer comprises at least one of liquid crystal polymer, a fluoropolymer, or nano-mineral oxide/hydroxide.

15. The membrane of claim 1, wherein each of said cap layer, upper inner layer, lower inner layer and core layer has a thickness of from about 5-23 mils (0.13-0.58 mm).

16. The membrane of claim 15, where said cap layer has a thickness of about 21 mils (0.53 mm), said upper inner layer has a thickness of about 6 mils (0.15 mm), said lower inner layer has a thickness of about 6 mils (0.15 mm), and said core layer has a thickness of about 21 mils (0.53 mm).

17. The membrane of claim 2, wherein said scrim comprises polypropylene, polyethylene terephthalate, and/or polyester.

18. The membrane of claim 1, wherein at least one of said layers comprise a blend of a plastomer, low density polyethylene, and a propylene based polymer.

19. The membrane of claim 1, wherein said roofing membrane is characterized by having a flexural modulus of from 10,000 to 30,000 psi (69-207 MPa).

20. The membrane of claim 18, where the low-density polyethylene includes linear low density polyethylene.

21. The membrane of claim 20, where the linear low density polyethylene includes an ethylene-a-olefin copolymer including from about 2.5 to about 13 mole percent mer units deriving from a-olefins.

22. The membrane of claim 21, where the linear low density polyethylene is characterized by a density of from about 0.885 g/cc to about 0.930 g/cc per ASTM D-792.

23. The membrane of claim 18, where the propylene-based polymer comprises a propylene homopolymer or copolymer comprising propylene and a comonomer, and where the copolymer includes, on a mole basis, a majority of mer units derived from propylene.

24. The membrane of claim 23, where the propylene-based copolymers include from about 2 to about 6 mole percent mer units deriving from comonomer, with the balance including mer units deriving from propylene.

25. The membrane of claim 18, further comprising a flame retardant selected from the group consisting of halogenated tlame retardants, non-halogenated flame retardants, and mixtures thereof.

26. The membrane of claim 25, where the halogenated flame retardants include halogenated hydrocarbons, where the halogenated hydrocarbons include hexabromocyclododecane, N,N'-ethylene-bis-(tetrabromophthalimide), and mixtures thereof, and where the non-halogenated flame retardants include magnesium hydroxide, aluminum trihydrate, zinc borate, ammonium polyphosphate, melamine polyphosphate, and mixtures thereof.

27. The membrane of claim 26, where the magnesium hydroxide includes a treated magnesium hydroxide or a functionalized magnesium hydroxide.

28. The membrane of claim 27, where the magnesium hydroxide includes magnesium oxide treated with or reacted with a carboxylic acid, or where the magnesium hydroxide includes that treated or reacted with stearic acid, or where the magnesium hydroxide includes that treated or reacted with silicon-containing compounds selected from the group including silanes, and polysiloxanes, or where the magnesium hydroxide includes magnesium hydroxide treated with titanates.

29. The membrane of claim 18, where the at least one layer comprises i) from about 5 to about 50% by weight plastomer, ii) from about 10 to about 90% by weight low density polyethylene, and iii) from about 5 to about 50% by weight propylene-based polymer based upon the total weight of the plastomer, low density polyethylene, and propylene-based polymer, and also includes iv) from about 10 to about 50% by weight magnesium hydroxide, based upon the total weight of the at least one layer.

30. The membrane of claim 29, where the at least one layer includes i) from about 10 to about 45% by weight plastomer, ii) from about 15 to about 85% by weight low density polyethylene, and iii) from about 10 to about 45% by weight propylene-based polymer based upon the total weight of the plastomer, low density polyethylene, and propylene-based polymer, and also includes iv) from about 15 to about 45% by weight magnesium hydroxide, based upon the total weight of the at least one layer.

31. The membrane of claim 18, where the at least one layer includes at least 31% by weight low density polyethylene based upon the total weight of the plastomer, low density polyethylene, and propylene-based polymer.

32. The membrane of claim 31, where the at least one layer includes at least 35% by weight low density polyethylene.

33. The membrane of claim 1, wherein at least one of said top and bottom sheets comprises at least three distinct layers.

34. The membrane of claim 1, wherein said membrane comprises a roofing membrane.

35. The membrane of claim 1, wherein said membrane comprises a geo membrane.

36. A structural membrane comprising a polymeric top sheet and bottom sheet and a scrim positioned therebetween, wherein said top sheet comprises a co-extruded cap layer and an upper inner layer, wherein said bottom sheet comprises a co-extruded lower inner layer and a core layer, wherein said cap layer and said upper inner layer are co-extruded through a first die, and wherein said lower inner layer and said core layer are co-extruded through a second die, creating intimately bonded top and bottom bi-layers, said cap and core layers comprising a thermoplastic olefin.

37. The membrane of claim 36, wherein said cap layer comprises tire retardant additives and said other layers are at least substantially free of such additives.

38. The membrane of claim 36, wherein at least one of said first or second dies is a dual cavity die.

39. The membrane of claim 36, wherein said cap layer comprises a fire retardant, and a UV stabilizer.

40. The membrane of claim 36, wherein at least one of said layers except said cap layer comprises a reinforcing filler that functions to improve the mechanical properties of said membrane.

41. The membrane of claim 40, where said reinforcing filler comprises wollastonite.

42. The membrane of claim 36, wherein said membrane comprises a nano-mineral or nano-clay.

43. The membrane of claim 36, wherein said upper inner layer comprises linear low density polyethylene (LLDPE).

44. The membrane of claim 43, wherein said inner layer comprises a LLDPE/PP blend.

45. The membrane of claim 36, wherein said cap layer comprises a pigment and wherein said other layers are substantially free of pigment.

46. The membrane of claim 36, wherein said membrane comprises an extruded adhesive on the edges of said membrane.

47. The membrane of claim 36, wherein said cap layer comprises at least one of liquid crystal polymer, a fluoropolymer, or nano-mineral oxide/hydroxide.

48. The membrane of claim 36, wherein each of said cap layer, upper inner layer, lower inner layer and core layer has a thickness of from about 5-23 mils (0.13-0.58 mm).

49. The membrane of claim 36, where said cap layer has a thickness of about 21 mils (0.53 mm), said upper inner layer has a thickness of about 6 mils (0.15 mm), said lower inner layer has a thickness of about 6 mils (0.15 mm), and said core layer has a thickness of about 21 mils (0.53 mm).

50. The membrane of claim 36, wherein said scrim comprises polypropylene, polyethylene terephthalate, and/or polyester.

51. The membrane of claim 36, wherein at least one of said layers comprise a blend of a plastomer, low density polyethylene, and a propylene based polymer.

52. The membrane of claim 36, wherein at one of said cap layer and upper inner layer of said first sheet and at least one of said lower inner layer and core layer of said second sheet has a greater width than a width of said scrim, such that said scrim is completely surrounded by said layers on the sides of the membrane.

53. The membrane of claim 52, wherein each of said cap layer, upper inner layer, lower inner layer, and core layer all have a greater width than a width of said scrim.

54. The membrane of claim 52, wherein only said cap layer and said core layer have a greater width than a width of said scrim.

55. The membrane of claim 52, wherein only said upper and lower inner layers have a greater width than a width of said scrim.

56. The membrane of claim 36, wherein said roofing membrane is characterized by having a flexural modulus of from 10,000 to 30,000 psi (69-207 MPa).

57. The membrane of claim 36, wherein at least one of said top and bottom sheets comprises at least three distinct layers.

58. The membrane of claim 36, wherein said membrane comprises a roofing membrane.

59. The membrane of claim 36, wherein said membrane comprises a geo membrane.

60. A structural membrane comprising polymeric top and bottom sheets and an intermediate scrim positioned therebetween, said top sheet comprising a co-extruded cap layer and upper inner layer, and said bottom sheet comprising a co-extruded lower inner layer and core layer, each of said co-extruded layers forming intimately bonded bi-layers, wherein said top and bottom sheets have a greater width than a width of said scrim, such that said scrim is completely surrounded by said sheets on the sides of the membrane.

61. A roof deck having a roofing membrane adhered thereto, said roofing membrane comprising at least a top and bottom sheet bonded together, said top sheet comprising a co-extruded cap layer and upper inner layer, wherein said upper inner layer is oriented between said cap layer and said bottom layer, said cap and upper inner layers being coextruded through a common die creating an intimately bonded bi-layer, said cap layer comprising a thermoplastic olefin and one or more additives that are at least substantially missing from the other layers, and wherein said bottom sheet comprises a co-extruded lower inner layer and core layer, said lower inner layer and said core layer being co-extruded through a second die to create an intimately bonded bi-layer.

* * * * *

UNITED STATES PATENT AND TRADEMARK OFFICE
CERTIFICATE OF CORRECTION

PATENT NO. : 7,882,671 B2  
APPLICATION NO. : 11/708898  
DATED : February 8, 2011  
INVENTOR(S) : Douglas et al.

Page 1 of 1

It is certified that error appears in the above-identified patent and that said Letters Patent is hereby corrected as shown below:

On the Title page Item (12) should read, (12) Douglas et al.

Item (75) should read, (75) Bruce Douglas, Zionsville, IN (US);
    Greg Sharrun, Greenville, SC (US);
    Richard Peng, Fishers, IN (US)

Signed and Sealed this
Third Day of April, 2012

David J. Kappos
*Director of the United States Patent and Trademark Office*